Figure 3:
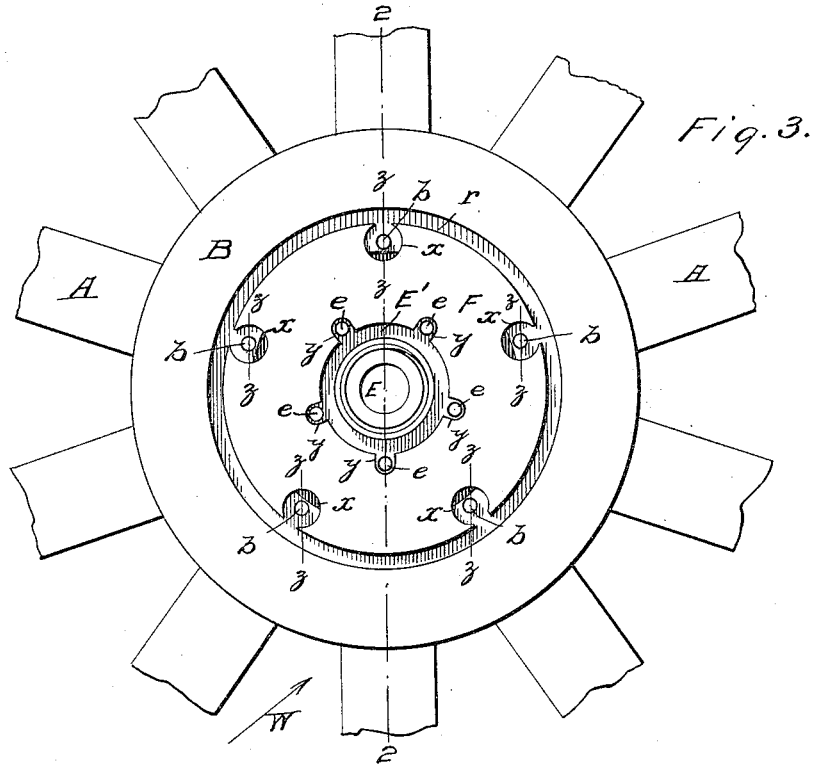

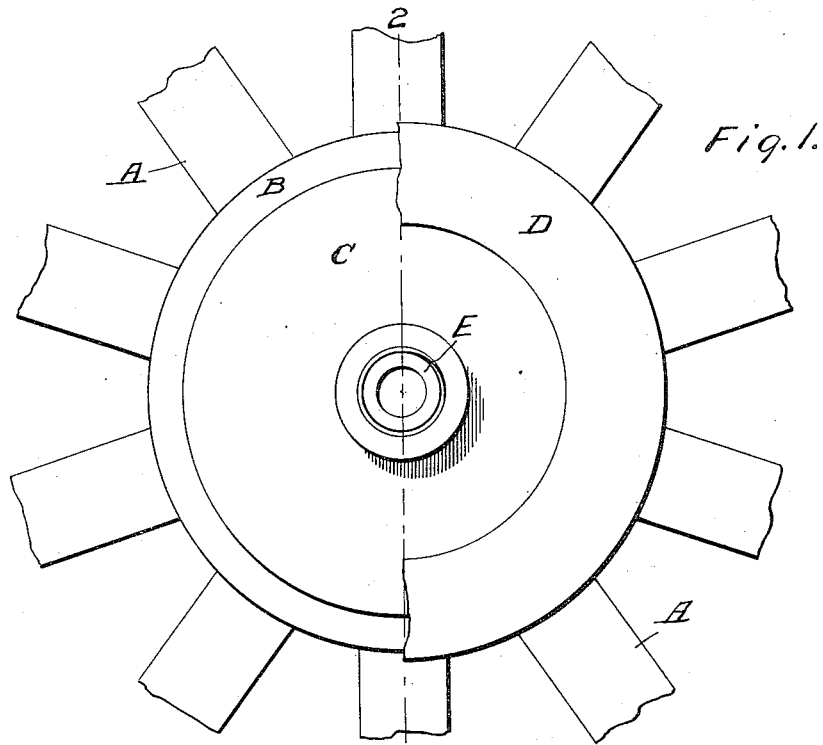
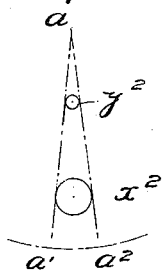
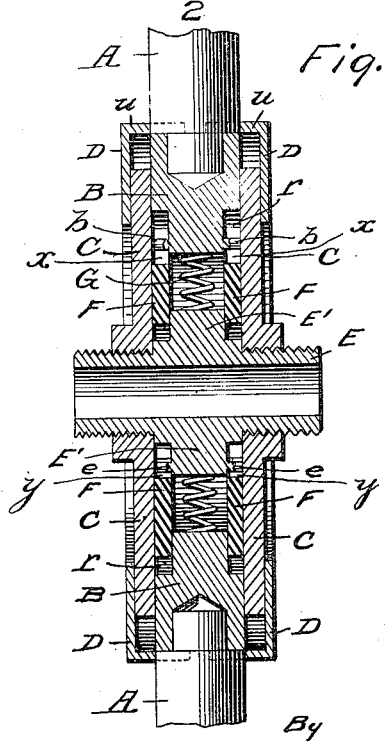

S. GORDON.
SPRING WHEEL.
APPLICATION FILED JAN. 22, 1913.

1,069,410.

Patented Aug. 5, 1913.
2 SHEETS—SHEET 2.

WITNESSES
E. C. Duffy
A. R. Stanton.

INVENTOR:
Simon Gordon.
By Edw. W. Byrn,
Attorney

UNITED STATES PATENT OFFICE.

SIMON GORDON, OF WASHINGTON, DISTRICT OF COLUMBIA.

SPRING-WHEEL.

1,069,410.     Specification of Letters Patent.     Patented Aug. 5, 1913.

Application filed January 22, 1913. Serial No. 743,681.

*To all whom it may concern:*

Be it known that I, SIMON GORDON, a citizen of the United States, residing at Washington, in the District of Columbia, have invented certain new and useful Improvements in Spring-Wheels, of which the following is a specification.

My invention relates to spring wheels for automobiles, and other uses, in which it is proposed to do away with the necessity for expensive rubber tires. It is an improvement in that class of spring wheels in which a series of spiral springs is arranged between the hub of the wheel and a surrounding ring of larger diameter, which ring is rigidly connected to the spokes and tire so that the wheel proper vibrates as a whole on a series of springs between it and the hub.

Figure 4:
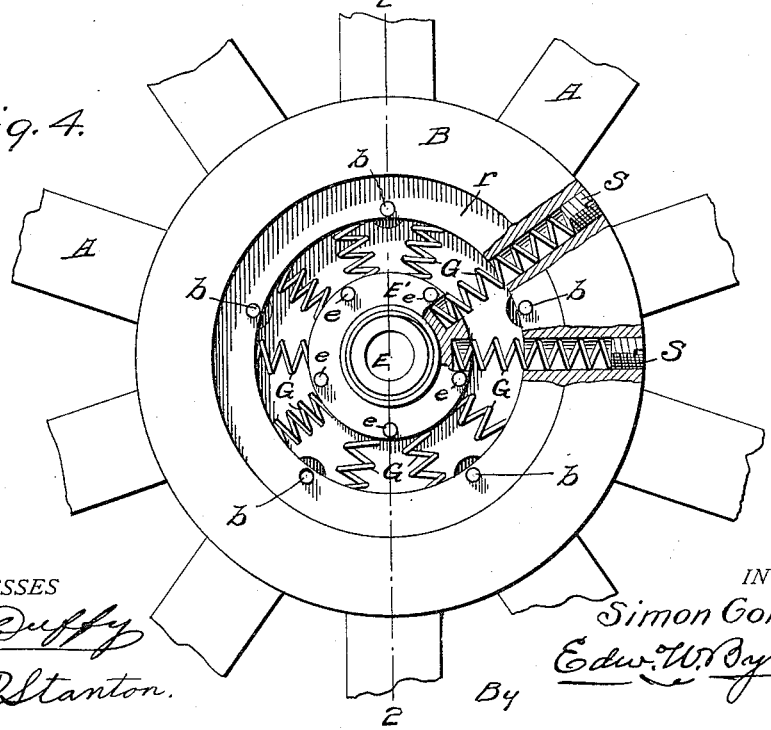

My improvement consists in the novel construction and arrangement of the parts adapted to all the conditions of travel, and of rotary strain, and in which the springs are easily removed and replaced without taking off the wheel or dismembering its parts, as will be hereinafter more fully described with reference to the drawing, in which:

Figure 1 is a side view of the central portions of the wheel, with one-half of the dust ring removed. Fig. 2 is a vertical section taken through the line 2—2 of Figs. 1, 3 and 4. Fig. 3 is a view of the interior of the hub portion with the casing disk removed, and showing in place one of the intermediate loose disk plates which lock the hub and surrounding ring together to permit the transmission of the rotary strain between hub and wheel and also allow free vibration in all directions. Fig. 4 is a similar view, partly in section, with the intermediate disk plate removed and showing the removable character of the series of radial spiral springs. Fig. 5 is an exterior edge view of a part of the inner wheel ring and dust guard, and Fig. 6 is a geometrical diagram, illustrating one of the principles of my wheel.

In the drawing, A represents the spokes and B the inner metal ring which is connected by the spokes rigidly to the outer tire or tread of the wheel, and forming the wheel proper, which vibrates in relation to and around the central hub E E' through the intermediary of radial spiral springs G. The central hub consists of a tubular portion E to be connected to the axle and having an enlarged middle portion or boss E' in which are formed sockets which receive the inner ends of the spiral springs G, as seen in Fig. 4. The outer ends of these springs are received into radial holes drilled into and through the inner ring B of the wheel at points between the spokes, the springs being retained in these holes by screw plugs S which may be screwed up to regulate the tension of the springs or be removed entirely to allow any spring to be taken out and replaced without disturbing the rest of the wheel.

On each side of the inner ring B of the wheel are formed concentric annular recesses $r$ which reduce the inwardly projecting portion of ring B to the same thickness as the boss E'. In these recesses is formed a circular series of laterally projecting pins $b$ extending outwardly from the narrower inner portion of ring B and on the sides of the boss E' of the central hub is formed a similar series of laterally projecting pins $e$. These pins form, through the intermediary of a loose disk F on each side, the means for connecting the hub to the wheel for rotary strain or for application of brakes. These intermediate disks F are shown in Figs. 2 and 3 and they lie in the recesses $r$ $r$. Each of these disks has on the outer periphery a circular series of large holes $x$ and on the inner periphery a circular series of smaller holes $y$. The large holes $x$ receive the pins $b$ of the ring B of the wheel and the small holes $y$ receive the pins $e$ of the hub portion of the wheel, so as to connect the hubs to the wheel for rotary strain. The object in making the holes $x$ in the disk larger than the holes $y$ is as follows. It will be seen that as $y$ is nearer the center of the wheel than $x$, the angle formed by two radii tangent to the opposite sides of holes $x$ and $y$ causes a constantly increased divergence, *i. e.*, the distance between two radial lines of a definite angle increases with the increasing radius. Thus, referring to the diagram, Fig. 6, if $a$ be the center of the wheel and a circular torque or rotary movement be represented by $a'$ $a^2$, then at the point $y^2$, near the center, a small diameter of a circle is required and at the point $x^2$ farther from the center a larger diameter will be required. Now the play of the pins $e$ in the holes $y$ of the disk is adjusted to the circle $y^2$ of Fig. 6, and the play of the pins $b$ in the holes $x$ of the disk is adjusted to the circle $x^2$ of Fig. 6. This causes the inner and outer pins to both come into bearing in the rotary strain at the same time and thus permits the clutch connection of disks F to the wheel ring B to be made at the outer edge of disks F and to the hub at the inner edge of the disks, and allows the torsional take-up to occur simultaneously at both points without lateral distortion of springs G. Furthermore, in any exactly vertical vibration of the wheel the movement is along the parallel lines $z$—$z$, Fig. 3, of all the pins $b$, so that, while the top hole $x$ is the only one in the vertical radial line, the large size of the other holes $x$ allows vibration in the vertical lines which are not radial. And still further, if an obstruction in the road, such as a stone or lump, should produce a strain on the wheel in the direction of the arrow W in Fig. 3, it will be seen that the play of the pins $b$ in the holes $x$ allows the wheel to yield in this direction, thus securing a yielding of the wheel in vertical direction or any angle to the vertical, and at the same time allowing the torsional strain or torque of the wheel hub on the wheel, and vice versa, to be transmitted from one to the other without disastrous effect on the springs.

On the opposite sides of the boss E' of the hub and the wheel ring B are casing disks C, inclosing the disks F, as seen in Fig. 2. These are screw threaded interiorly at the center and screwed onto the tubular portions E of the hub and fit closely against the sides of the wheel ring B, so as to close in the springs and form a casing, but they move with the hub transversely to the axle, as the hub varies in its relation to the center of the wheel incident to the yielding of the springs. Outside of the outer periphery of the casing disks C are flanged dust rings D, D whose outer edges are provided with right angular flanges $u$ that extend over the outer periphery of the ring B and in between the spokes, as in Figs. 2 and 5, and are secured to the ring B by screws $t$ parallel to the plane of the wheel. These dust rings exclude dust and dirt from the joint between the casing disks C and the ring B and, said dust rings being rigidly connected to the ring B, the casing disks C are free to slide at right angles to the axle between said dust ring D and inner wheel ring B, as seen in Fig. 2. These dust rings, while secured to the outer periphery of ring B, are cut away at their inner edges between the spokes so as not to cover the adjusting screws S for the springs.

I claim:

1. A spring wheel, comprising an inner hub portion screw threaded at its ends and provided centrally with an outwardly projecting circumferential boss, an inner wheel ring with an inwardly projecting annular portion of the same width as the boss of the hub and with symmetrical annular recesses on each side, two outer casing disks screwed upon the ends of the hub and fitting against the sides of the inner wheel ring, radially arranged spiral springs inside the outer casing disks and between the inner wheel ring and the boss of the hub, and two detachable loose disks located inside the casing disks, one on each side of the boss of the hub and the inner projection of the inner wheel ring, and having locking connections with the boss of the hub and the inner projection of the wheel ring.

2. A spring wheel, comprising an inner hub portion, an inner wheel ring, springs arranged between the two, outer casing disks connected to the hub, and a detachable loose disk for connecting the hub and wheel ring, said disk being located inside the casing disk and having two series of interlocking connections, an inner set with the hub, and an outer set with the wheel ring, said interlocking connections having a greater play circumferentially at the outer periphery of the disk than they have at the inner periphery of the disk.

3. A spring wheel, comprising an inner hub portion, an inner wheel ring, springs arranged between them, two outer casing disks connected to the hub, and a detachable loose disk for connecting the hub and wheel ring, said disk being located inside the casing disk and having two series of interlocking connections, an inner set with the hub, and an outer set with the wheel ring, and said interlocking connections having a greater play circumferentially at the outer periphery of the disk than they have at the inner periphery of the disk, and consisting of laterally projecting pins on the wheel ring and hub and holes in the outer and inner portions of the loose disk, the outer holes being made of larger size than the inner holes.

4. A spring wheel comprising an inner hub portion provided with an outwardly projecting circumferential boss, an inner wheel ring with an inwardly projecting annular portion of the same width as the boss of the hub, having annular recesses on each side and radial holes extending through both the narrower inner portion of the ring and the outer periphery of the same, spiral springs arranged in these holes, screw plugs for the outer ends of these holes, outer casing disks connected rigidly to the hub and fitting against the sides of the inner wheel ring, and two detachable loose disks located inside the casing disks, one on each side of the boss of the hub and extending beyond the narrower inwardly projecting portion of the inner wheel ring, and locking connections between the outer portion of these loose disks and the wheel ring and also locking connections between the inner portion of the loose disks and the boss of the hub.

5. A spring wheel, comprising an inner hub portion provided with an outwardly projecting circumferential boss, an inner wheel ring with an inwardly projecting annular portion of the same width as the boss of the hub, having annular recesses on each side and radial holes extending through both the narrower inner portion of the ring and the outer periphery of the same, spiral springs arranged in these holes, screw plugs for the outer ends of these holes, outer casing disks connected rigidly to the hub and fitting against the sides of the inner wheel ring, and two detachable loose disks located inside the casing disks, one on each side of the boss of the hub and extending beyond the narrower inwardly projecting portion of the inner wheel ring, and locking connections between the outer portion of these loose disks and the wheel ring and also locking connections between the inner portion of the loose disks and the boss of the hub, and two annular dust guards, each having flanges on the sides extending down over the sides of the outer casings, and right angular flanges extending over the outer periphery of the inner wheel ring, but exposing between said flanges the screw plugs for the spring holes, and radially arranged screws for securing said flanges.

In testimony whereof I affix my signature in presence of two witnesses.

SIMON GORDON.

Witnesses:
E. C. DUFFY,
M. E. DILLER.

---

Copies of this patent may be obtained for five cents each, by addressing the "Commissioner of Patents, Washington, D. C."